United States Patent [19]

Usher et al.

[11] Patent Number: 4,507,472

[45] Date of Patent: Mar. 26, 1985

[54] MANUFACTURE OF DIETHYLAMINOETHYL DEXTRANS

[76] Inventors: Thomas C. Usher, Box N 7525, Nassau, The Bahamas; Natu Patel, 54, Cottsmore Cre., Muskham, Ontario, Canada

[21] Appl. No.: 504,367

[22] Filed: Jun. 14, 1983

[51] Int. Cl.³ ............................................. C08B 37/02
[52] U.S. Cl. ....................................... 536/51; 536/112
[58] Field of Search ................... 536/51, 112; 424/180, 424/190

[56] References Cited

U.S. PATENT DOCUMENTS

| | | | |
|---|---|---|---|
| 2,807,610 | 9/1957 | Zief et al. | 536/112 |
| 3,022,221 | 2/1962 | Floramo | 424/180 |
| 3,234,209 | 2/1966 | Floramo | 536/112 |
| 3,851,057 | 11/1974 | Kuzuya | 424/180 |
| 4,303,638 | 12/1981 | Tayot et al. | 424/32 |
| 4,308,254 | 12/1981 | Tayot et al. | 424/124 |
| 4,347,244 | 8/1982 | Mynard et al. | 424/180 |

FOREIGN PATENT DOCUMENTS

| | | | |
|---|---|---|---|
| 3105584 | 9/1978 | Japan | 536/112 |
| 517397 | 1/1940 | United Kingdom | 536/112 |

OTHER PUBLICATIONS

Peterson et al., Chromotography of Proteins. I. Cellulose Ion-Exchange Adsorbents, J. Am. Chem. Soc. 78: 751-55, (1956).

Antonini et al., Dextran and Its Derivatives. III. Preparation and Properties of Carboxymethyl and Diethylaminoethyl Derivatives of Native Dextran, Chem. Abs. 63: 4375h, (1965).

Platoshkin, B-Aminoethyldextran, Chem. Abstracts 82: 74774v, (1974).

Tryon et al., Hydrodextran: Preparation and Study on Blood Level and Excretion Rate, Chem. Abstracts 48: 3553h, (1954).

McKernan et al., A Basic Derivative of Dextran and Its Interaction with Biological Systems, Chemistry and Industry, pp. 1490-1491, (Nov. 1959).

Parkinson, Metabolism of Orally Administered Dextran and "Sephadex" Derivatives in the Rat, Nature 215: 415-416, (1967).

*Primary Examiner*—Delbert R. Phillips
*Assistant Examiner*—Charles H. Thieman
*Attorney, Agent, or Firm*—I. Louis Wolk

[57] ABSTRACT

This invention relates to an improved process for the manufacture of diethylaminoethyl dextran (DEAE dextran) and the diethylaminoethyl derivative of hydrogenated dextran (DEAE hydrodextran). A product of greater purity and improved color is obtained by the addition of a borohydride, such as sodium borohydride during manufacture to generate hydrogen in situ during the reaction.

5 Claims, No Drawings

MANUFACTURE OF DIETHYLAMINOETHYL DEXTRANS

BACKGROUND

Diethylaminoethyl dextran has been reported to be effective in treating hypercholesteremia in mammals and birds (Parkinson, U.S. Pat. No. 3,627,892), reducing blood lipids (Kuzuya, U.S. Pat. No. 3,851,057) and in reducing body weight by inhibiting lipid absorption (Fischetti, U.S. Pat. No. 4,160,826). In production by conventional methods, for example as described in the Parkinson and Kuzuya patents referred to above, it has been found that the product contains impurities which produce discoloration and require removal by recrystallization or reprecipitation and/or treatment with activated carbon, dialysis or the like. Such procedures involve substantial losses of product as well as considerable time and expense.

As described on the prior art, DEAE—dextran is generally produced by reacting dextran with diethylaminoethyl chloride hydrochloride in the presence of an alkali metal hydroxide.

DESCRIPTION OF THE INVENTION

Applicant has discovered that if the reaction with dextran is carried out under hydrogenating conditions, as by the introduction of an alkali metal borohydride, i.e. sodium borohydride ($NaBH_4$), discoloration of the product and formation of impurities can be minimized or eliminated and recovery of a pure product facilitated.

Applicant has further discovered that dextran which has been hydrogenated to produce a hydrodextran through reaction with the terminal aldehyde group normally present in the dextran polymer, when reacted to produce its DEAE derivative, will possess an even higher degree of purity and improved color than when using dextran itself.

The proportions of reactants used will depend upon the degree of substitution required in the final product. For example, for use in the reduction of blood lipids, as described in U.S. Pat. No. 3,851,057, a ratio of diethylaminoethyl halide to dextran of 2.3–10 mols. based on the dextran in the presence of 4–8 times the weight of water to the weight of the dextran and alkali metal hydroxide of at least 2 mols. based on the weight of the DEAE halide, is required to produce a satisfactory product. Such proportions are suitable for carrying out the present process, but may be varied depending upon the degree of substitution desired.

Although the reaction can proceed slowly at room temperature, temperatures up to 100° C. may be employed. The quantity of borohydride required will depend to a certain extent upon the nature and purity of the dextran, its molecular weight and whether or not it is the hydrogenated derivative as well as the reaction conditions employed. In general, from 0.1 to 1.0 percent of sodium borohydride based on the weight of dextran will produce satisfactory results with 0.2–0.4 percent preferred with hydrogenated dextran and somewhat larger quantities with normal dextran.

The invention may be best illustrated by the following examples:

EXAMPLE I 100 kg dextran (m.w. 500,000) is dissolved in 217 liters of de-ionized water. 67 kg caustic soda is dissolved in 50 liters of de-ionized water. The dextran solution is first formed by introducing the required amount of water into a reactor and then adding the powdered dextran. Mixing is carried out for a minimum of 6 hours or until all the dextran powder is dissolved. After preparation of the alkali solution, it is allowed to cool and then added to the dextran solution in the reactor. 200 grams of sodium borohydride is then added to the reactor and allowed to mix for 10–15 minutes.

145 kg. of 2-chlorotriethylamine HCl (dithylaminoethyl chloride HCl) is now introduced into the reactor which is then steam heated to raise the reaction temperature to 85° C. and maintained with mixing between 85° C. and 90° C. for 45 minutes. At this point heating is discontinued and the reaction mixture allowed to cool to 40° C. or less. Preferably the solution is further diluted with about 70 liters of de-ionized water at room temperature to aid in cooling and in reducing the viscosity of the mixture.

When cool, the reaction mixture is neutralized to a pH between 6.5–7.0 by the addition of concentrated HCl (about 65 liters).

The DEAE dextran hydrochloride so produced is now ready for precipitation. This is preferably accomplished by means of isopropanol which is added to the reactor with gentle mixing to a concentration of about 66% isopropanol (v/v) and allowed to mix for 15 minutes. The precipitate is then allowed to settle for 4–5 hours. After which the supernatant liquid is pumped to a storage tank for recovery of the precipitant.

The precipitate, which is DEAE—dextran hydrochloride is relatively impure and requires further purification. This is carried out by dissolving it in de-ionized water to a concentration of about 20% and then further precipitating with isopropanol as above. The precipitation and dissolution procedure may be carried out three more times until a desired degree of purity is obtained. In order to obtain a pharmaceutical grade product, re-precipitation is carried out until the ash content (dry basis) is less than 2.0%. The precipitate is then dissolved in de-ionized water to 10% and the solution passed through a filter press, after which it is spray dried. The resulting powder was a pale beige in color.

Other salts may also be used such as the sulphate, phosphate, etc. These are formed by using sulphuric acid, phosphoric acid, etc. in neutralizing the reaction mixture.

EXAMPLE II

The procedure of Example I was carried out substituting the same quantity of hydrogenated dextran (m.w. 500,000) for the dextran starting material. The hydrogenated dextran was produced by the reduction of dextran using sodium borohydride by the method described in U.S. Pat. Nos. 3,022,221 or 3,234,209. The same proportions of reactants were utilized.

Reaction with sodium borohydride and 2-chlorotriethylamine HCl was carried out in the same manner as were the precipitation and recovery procedures. The final product was DEAE dextran hydrochloride as a fine almost white powder showing a somewhat greater degree of purity than the product of Example I.

EXAMPLE III

The procedures of Example I and II were carried out with dextran and hydrogen dextran respectively, (m.w. 500,000) as starting materials using the same proportions of reactants and conditions but without the addition of sodium borohydride. The resulting products even over several repeated reprecipitations and washings showed a higher degree of impurity and discoloration than either of the products of Examples I and II. These products range from pale to medium brown in color. It is believed that during the reaction with 2-chlorotriethylamine hydrochloride the dextran incurs hydrolysis to produce additional aldehyde groups resulting in discoloration or carmelization of the product as an indication of decomposition of the polymer and undesired side reaction products. Even when the dextran has been subjected to preliminary hydrogenation, the discoloration which results when borohydride is not used indicates the occurrence of these undesired reaction products.

Although the above examples have been described with reference to dextrans having a molecular weight designation of 500,000, the same procedures are applicable to other dextrans generally in the molecular weight range of 20,000 to a 1,000,000 or more, since the use of the borohydride to generate nascent hydrogen during the reaction is equally effective in producing a product of superior purity.

We claim:

1. The method for the manufacture of diethylaminoethyl dextran which comprises reacting dextran with 2-chlorotriethylamine hydrochloride in alkaline aqueous medium in the presence of an alkali metal borohydride at an elevated temperature between room temperature and 100° C. and recovering the diethylaminoethyl dextran produced thereby.

2. The method according to claim 1 wherein the dextran has been preliminarily hydrogenated to produce hydrodextran which is then utilized as the dextran starting material.

3. The method according to claim 1 wherein the reaction mixture is neutralized with hydrochloric acid to produce diethylaminoethyl dextran hydrochloride.

4. The method according to claim 1 wherein the alkali metal borohydride is sodium borohydride.

5. The method according to claim 1 wherein the reaction is carried out using 2.3–10 mols. of 2-chlorotriethylamine hydrochloride per mol of dextran and 0.1–1 percent by weight of sodium borohydride based on the weight of dextran.

* * * * *